March 17, 1970  A. STENERT ET AL  3,501,212
AXIAL OR THRUST ROLLER BEARING HAVING SPACING MEMBER
BETWEEN EACH TWO ROLLERS
Filed April 22, 1968  2 Sheets-Sheet 1

INVENTOR
ALOIS STENERT
JOSEF BRACHT
WERNER HÜSTEN

United States Patent Office 3,501,212
Patented Mar. 17, 1970

3,501,212
AXIAL OR THRUST ROLLER BEARING HAVING SPACING MEMBER BETWEEN EACH TWO ROLLERS
Alois Stenert, Lippstadt, Josef Bracht, Erwitte, and Werner Husten, Eickelborn, Germany, assignors to Eisenwerk Rothe Erde GmbH, Dortmund, Germany, a corporation of Germany
Filed Apr. 22, 1968, Ser. No. 723,063
Claims priority, application Germany, Apr. 28, 1967, R 45,896
Int. Cl. F16c 33/46
U.S. Cl. 308—235
9 Claims

ABSTRACT OF THE DISCLOSURE

The invention relates to an axial or thrust roller bearing in which between each two bearing rollers spacing members are positioned. These two spacing members have respectively convex and concave surfaces, at least one of these surfaces being in the form of a circular arc about a center which is parallel to the axial direction of the bearing. The intermediate spacing members are formed of a circular arc about a center which is parallel to the axial direction of the bearing. The intermediate spacing members are formed to move with the bearings in races. By such a construction, the same rollers and intermediate members can be used in thrust bearings of differing diameter.

BACKGROUND OF THE INVENTION

Field of the invention

The invention relates to an axial thrust roller bearing, in which two spacing members are provided between each two rollers.

The prior art

It is known to use spacing members between roller bearings whose axial extent is shorter than the axial length of the rolls. Such spacing members are limited by two concave cylindrical surfaces, with which the peripheries of the two rollers engage. Other spacing members are known, the length of which is greater than the axial length of the rolls. These spacing members have an I-form and the flanges on the base sides engage one another. The outer flanges must therefore as compared to the diameter of the rollers be relatively large.

SUMMARY OF THE INVENTION

The invention provides spacing members, the form of which is independent of the diameter of the roller track, so that they can be used with thrust roller bearings of varying diameters.

According to the invention, there is positioned between each two rolls two spacing members, which have surfaces engaging each other, one of which surfaces is of cylindrical form in a direction parallel to the axial direction of the bearing. The other surface can also be of cylindrical form, one surface being convex and the other concave. But it is also possible to use a non-cylindrical surface, for example in the form of a convex or concave part of a polygon. The surfaces preferably lie in such a way that a tangential plane touching the middle of the cylindrical surface passes through the axis of the bearing or at least almost through the axis.

The two spacing members enclosing a roller can be connected into a one-piece cage. Advantageously such a cage is made of an elastic material, for example, a plastic, so that the rollers can be pressed into the cage and will then be held from falling out of the cage.

BRIEF DESCRIPTION OF THE DRAWINGS

The invention will be more fully understood with reference to the accompanying drawings, which form a part thereof.

Figure 1:
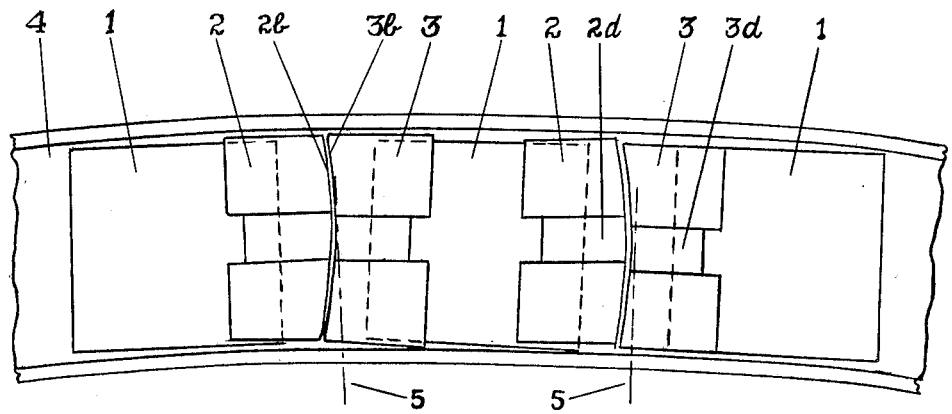
FIG. 1 shows a plurality of rollers of a bearing according to the invention, in end view, that is in the axial direction of the bearing.
Figure 2:
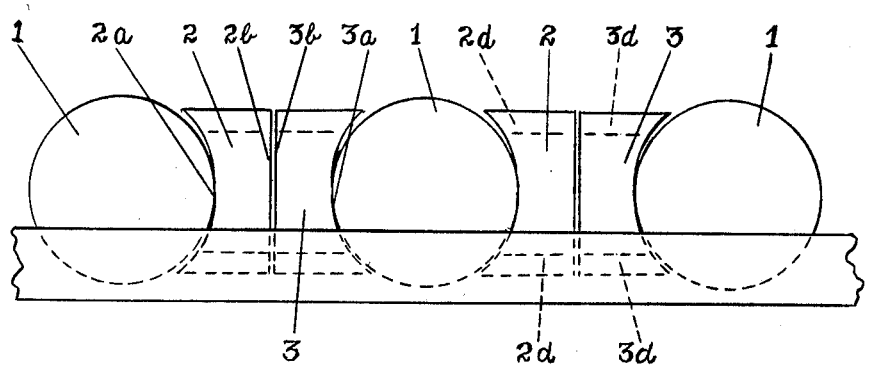
FIG. 2 shows the same arrangement in top elevation

In the arrangement of FIGS. 1 and 2, between each pair of rolls 1 and the thrust bearing are two spaces 2 and 3. The rolls and spacers run in the roller space 4 of the bearing ring. The spacers 2 and 3 have on one side cylindrical surfaces 2a, 3a, which in general correspond to the cylindrical form of the rollers 1. On the sides opposite the surfaces 2a or 3a of the two spacers 2 and 3, there are surfaces 2b and 3b. The surface 2b is a convex cylindrical surface, the surface of 3b a concave cylindrical surface. Both surfaces are cylindrical about axis of the bearing. The surfaces 2 and 3 appear of this nature in the side view of the bearing as seen in the direction of the bearing axis (FIG. 1) as curved lines. The tangential plane at the middle of the curved surface 3b, which is indicated by the broken line 5, intersects approximately the axis of the bearing.

The spacers 2 and 3 have on their upper and lower sides recesses 2d or 3d, which serve to receive a lubricating medium.

The rollers and spacing members travel in a track 4 which forms the race for the bearing.

Figure 3:
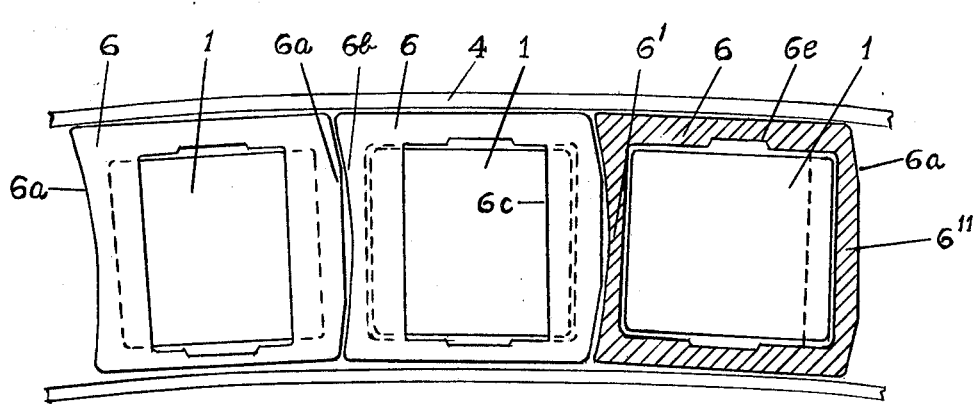
FIG. 3 shows an end view, partly in section, of another modification of a bearing according to the invention.
Figure 4:
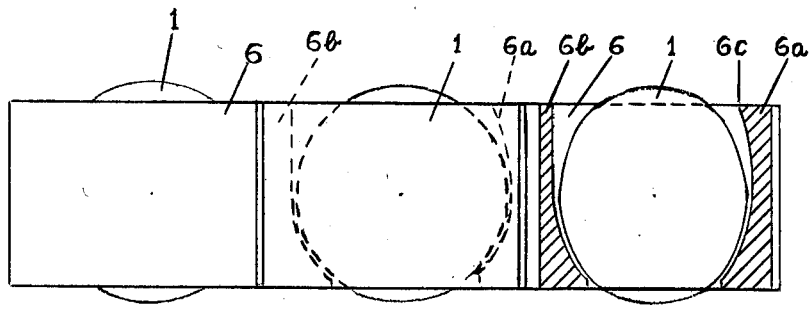
FIG. 4 shows a top view of FIG. 3.

In the form of FIGS. 3 and 4, each roll is located in a cage 6. Two adjacent cages 6 engage with their outer surfaces 6a and 6b. A concave surface 6b is formed as a part of the cylinder about an axis parallel to the axial direction of the bearing, whereas the convex surface 6a has the form of a polygonal surface, which forms an envelope for the adjacent cage. Consequently there exists between the middle parts of the surfaces 6a and 6b an open space, which serves as a lubricant chamber. Also in this way the middle portions 6' and 6" of the walls are relieved of load and are protected from deformation.

Further access for lubricating medium is provided by spaces 6e in the side walls of the cages 6, against which the ends of the rollers can engage.

The walls 6' and 6" whose outer sides have the described concave and convex surfaces 6b and 6a corresponding with each other, have in part 6b their inner sides (those nearest the bearing axis) of concave cylindrical form corresponding to the form of roller 1 as is shown in FIG. 4, while all of the inner wall of part 6a is curved, terminating at 6c. Through this construction of the walls, 6', 6" the roller 1 is secured in the cage 6 against falling out, but a pushing in of the roller 1 into the cage 6 is possible because the cage 6 is made of a sufficiently elastic material.

The form of the surfaces 2b, 3b, 6a, 6b makes it possible to modify the curvature of the roller race, whether the diameter is smaller or greater. The form of the cages 6 assures the rollers 1 against displacement in a radial direction of the bearings. This is because the wall 6a is curved inwardly sufficiently so that the space between the top edge 6c of this wall and the top edge of 6b is slightly less than the diameter of the roller.

It will be apparent that the concave and convex surfaces will permit the rollers to be shifted into different positions with respect to one another, so that the radius of the bearings can be varied.

Also, in the form of FIGS. 3 and 4, the walls 6' and 6" of two successive cages constitute the two spacer members between adjacent rollers.

FIG. 4 shows the end roller 1 in perspective, whereas in FIG. 2 the rollers are shown as if the track for the rollers were straightened out.

While we have described herein one embodiment of the invention, we wish it to be understood that we do not intend to limit ourselves thereby except within the scope of the claims hereto or hereinafter appended.

What we claim is:

1. Thrust bearing with spacer members between the rolls, characterized in that between each two rolls two unconnected spacer members are positioned which have surfaces engaging one another, one of these surfaces being a cylindrical surface formed about an axis parallel to the axes of the bearing.

2. Thrust bearing as claimed in claim 1 wherein one of said surfaces is concave and the other convex.

3. Thrust bearing as claimed in claim 2, wherein both surfaces are cylindrical.

4. Thrust bearing as claimed in claim 2, wherein one of the surfaces is polygonal.

5. Thrust bearing as claimed in claim 1 in which the spacer members on opposite sides of a roll are connected to form a cage.

6. Thrust bearing as claimed in claim 5, in which the cage is formed of elastic material and includes slidably releasable means normally preventing the roll from escaping therefrom.

7. Thrust bearing as claimed in claim 6 in which the cage is formed of a plastic.

8. Thrust bearing as claimed in claim 5, in which the cage has pockets in the interior wall thereof facing the ends of the rolls for holding a lubricant.

9. Thrust bearing as claimed in claim 1, in which the spacing members have lubricant-receiving grooves in their walls on the opposite side from the roll-engaging surfaces.

References Cited

UNITED STATES PATENTS

| | | | |
|---|---|---|---|
| 631,393 | 8/1899 | Bradshaw | 308—235 XR |
| 2,665,958 | 1/1954 | Waldherr | 308—235 XR |

MARTIN P. SCHWADRON, Primary Examiner

F. SUSKO, Assistant Examiner